United States Patent [19]

Peeters

[11] Patent Number: 4,910,624
[45] Date of Patent: Mar. 20, 1990

[54] OPTICALLY READABLE DISK WITH SELF CENTERING HUB

[75] Inventor: Hendrikus W. C. M. Peeters, Hapert, Netherlands

[73] Assignee: U.S. Philips Corporation, New York, N.Y.

[21] Appl. No.: 352,656

[22] Filed: May 12, 1989

Related U.S. Application Data

[63] Continuation of Ser. No. 111,900, Oct. 21, 1987, abandoned.

[30] Foreign Application Priority Data

Dec. 1, 1986 [NL] Netherlands ............... 8603060
Mar. 26, 1987 [NL] Netherlands ............... 8700704

[51] Int. Cl.[4] .................................. G11B 23/03
[52] U.S. Cl. ........................ 360/133; 369/282
[58] Field of Search ............. 360/133, 97.01, 99.01, 360/99.04, 99.05, 99.08, 99.12; 369/271, 282; 206/444

[56] References Cited

U.S. PATENT DOCUMENTS

| | | | |
|---|---|---|---|
| 3,416,154 | 12/1968 | Heller et al. | 346/137 |
| 3,706,085 | 12/1972 | Mowrey et al. | 360/135 |
| 3,729,720 | 4/1973 | Darling et al. | 346/137 X |
| 4,159,494 | 6/1979 | Evans et al. | 360/133 |
| 4,218,065 | 8/1980 | Van Der Hoek | 274/9 R |
| 4,358,803 | 11/1982 | Van Der Giessen | 360/99 |
| 4,470,137 | 9/1984 | Tago | 369/270 |
| 4,503,530 | 3/1985 | Hinlein et al. | 360/97 |
| 4,535,434 | 8/1985 | Kishi | 360/133 X |
| 4,542,426 | 9/1985 | Wilkinson et al. | 360/133 X |
| 4,583,144 | 4/1986 | Kato | 360/133 |
| 4,670,077 | 6/1987 | Peeters | 156/245 |
| 4,695,910 | 9/1987 | Moruyano et al. | 360/133 |

FOREIGN PATENT DOCUMENTS

| | | |
|---|---|---|
| 0195330 | 9/1986 | European Pat. Off. . |
| 0228126 | 7/1987 | European Pat. Off. . |
| 0230695 | 8/1987 | European Pat. Off. . |
| 0230963 | 8/1987 | European Pat. Off. . |
| 0233644 | 8/1987 | . |
| 0210580 | 11/1984 | Japan . |
| 2183398 | 6/1987 | United Kingdom . |

Primary Examiner—Stuart N. Hecker
Assistant Examiner—David J. Severin
Attorney, Agent, or Firm—John Francis Moran

[57] ABSTRACT

Information carrier includes an optically readable disc with a center hole and a hub with radially resilient clamping members which extend through the center hole to retain it on the disc and center it with respect to the information carrying surface on the disc. The hub further carries a sleeve which centers it on a spindle, and a magnetizable clamping ring for retaining it on a turntable, which carries permanent magnets. In an information carrier having two discs sandwiched together, the clamping members of each hub extend between the clamping members of the other hub and pass through the center holes of both discs to engage the opposite disc and retain the discs to each other.

17 Claims, 4 Drawing Sheets

OPTICALLY READABLE DISK WITH SELF CENTERING HUB

This is a continuation of application Ser. No. 111,900 filed Oct. 21, 1987, now abandoned.

FIELD OF THE INVENTION

The invention relates to an information carrier having a first side to be directed towards a drive means and an opposite second side. The carrier includes at least one disc provided with an information surface and having a central part of a dimensionally stable material formed with a center hole, and at least one hub for centering and clamping the information carrier on a drive spindle of a drive means. The hub has first centering means adapted to cooperate with the inner wall of the center hole for centering the hub relative to the center of the disc and second centering means for centering the hub and hence the information carrier relative to the drive spindle. The hub also has a flange member at the first side of the information carrier, which flange member rests on the central part of the disc.

Information carriers of this type are employed, for example, for the permanent or temporary storage of audio and/or video information or digital information intended for or supplied by computers. The disc may have a magnetisable surface which can be inscribed and read by appropriate magnetic-head means. Other known information carriers are optically readable by means of a beam of radiation. During their fabrication optically readable information carriers may already be provided with an optically readable structure containing audio, video or other information, for example computer programs or data files. Such information carriers are optically readable but generally a user cannot record information on the disc. Some known optically readable information carriers can be inscribed and depending on the type of optically sensitive layer which is used the information carrier is inscribable but not erasable or is both inscribable and erasable. The last category of optically readable information carriers includes, for example, magneto-optical information carriers. Both flexible and rigid discs exist. For the invention it is necessary that at least the central part of the disc is dimensionally stable.

DESCRIPTION OF PRIOR ART

An optical information carrier of the type defined in the opening paragraph is described in the Applicant's previous European patent application No. 0,066,317 (U.S. Pat. No. 4,504,936, herewith incorporated by reference). The information carrier described therein comprises two discs which are hermetically sealed to each other with interposed annular spacers. The known information carrier is readable both from the first side and from the second side and for the purpose of centering and clamping it carries a hub on each side. Each hub is provided with first centering means adapted to cooperate with the inner wall of the center hole for centering the hub relative to the center of the disc, which means are constructed as an annular member which engages the center hole. The second centering means of each hub, which serve for centering the hub and hence the information carrier relative to the drive spindle, includes a projection which is directed away from the information carrier and which has the shape of a truncated cone. The two hubs are secured to the discs at the first side and the second side of the information carrier in a manner not shown.

In information carriers of the type defined above the hub should guarantee a highly accurate centering of the information carrier relative to the axis of rotation. Moreover, the hub must be secured in such a way that the information carrier can be brought to speed and subsequently be braked within a reasonable, preferably very short, time. Mounting the hub should not adversely affect the high quality of the information carrier, in particular of the disc or discs and the information recorded thereon. Preferably, the hubs can be mounted with few elements and as rapidly as possible, in such a way that the hubs are centered, very accurately relative to an information structure already present in the information surface of the disc or discs and also relative to the mass center of the information carrier.

Accurately centering the information carrier on a drive spindle and securing the hub to the information carrier is a problem in particular in the case of optical information carriers with a minute distance of the order of magnitude of 2 microns. Numerous solutions have already been proposed.

For example, in European patent application No. 8501148 (U.S. Pat. No. 4,670,077, herewith incorporated by reference) it is proposed to center an optical information carrier, comprising two disc secured to each other, with the aid of a spacer means which is disposed accurately relative to the information surface between the discs. Although this enables excellent centering the proposed construction is only suitable for information carriers where the information surface is situated in an information layer which is deposited on a transparent substrate in liquid or at least deformable form. Each disc together with the previously mounted spacer means is fixed to a mould and is centered before the information structure is formed. For the purpose of clamping the information carrier on a drive spindle separate hub portions have to be mounted at a later stage.

European patent application No. 0,030,754 (U.S. Pat. No. 4,358,803, herewith incorporated by reference) discloses an information carrier having a hub which is radially deformable by subjecting it to axial force. The associated drive means has a spindle with a turnable provided with a recessed portion having a cylindrical wall. Radial expansion enables the hub to be centered simultaneously relative to the wall of the center hole of the information carrier and relative to the wall of the recessed portion of the turntable. An axial force must be exerted on the center of the hub during operation, which requires either a mechanism arranged above the drive spindle to exert pressure on the rotating central portion of the disc, or provisions in the rotating spindle which cooperate with the hub by gripping it and pulling it downwards. Mechanisms of this type are usually comparatively intricate and occupy a certain amount of space. Such an amount of space is not always available in particular when the drive means is intended for smaller information carriers to be used in consumer equipment or in peripheral equipment for small computers.

Yet another hub construction is known from European patent application No. 0,117,576 (U.S. patent application No. 490,801 herewith incorporated by reference). This publication describes an information carrier which does not have a center hole and whose hub is secured directly to a transparent disc. This may be effected, for example, by means of an adhesive. In principle the hub is also suitable for information carriers having a center hole. In practice, securing a hub to a disc of an information carrier by means of an adhesive or similar manner is not simple. First of all, it is necessary to center the hub of each information carrier exactly relative to the mass center of the information carrier or relative to the information structure, if present. Moreover, in production securing by means of adhesives or similar methods demands a comparatively long cycle time, needed for mounting the hub. In practice it is also found that securing the hub directly to a plastic disc may affect the optical properties of the disc in the proximity of the hub by introducing stresses in the disc material. In the case of optical information carriers birefringence may then give rise to problems in reading those parts of the information structure which are situated nearer the center of the information carrier. This may result in an undesirably large number of products being rejected.

SUMMARY OF THE INVENTION

The first centering means includes radially resilient centering portions which act against the inner wall of the center hole. The hub includes clamping means which pass through the center hole and by cooperation with the central part at the opposite side of the information carrier urge the flange member of the hub against the disc. The clamping means includes radially resilient clamping portions each having a cross-sectionally hook-shaped end adapted to engage behind a part of the information carrier situated nearer the opposite side.

With the information carrier in accordance with the invention the hub can be mounted rapidly and easily by simply inserting it axially into the center hole. The radially resilient clamping members with their hook-shaped ends automatically anchor the hub to the disc or discs. Thus, mounting of the hub is simplified substantially by connecting the hub to the disc or discs by means of what may be referred to as a snap connection. Nevertheless, the radially resilient centering means guarantee an excellent centering of the hub relative to the disc.

Thus, the information carrier in accordance with the invention ingeniously utilizes the "spring-nest effect". This effect is to be understood to mean the effect that an accurate positioning can be obtained by means of a plurality of radially resilient centering portions which cooperate with an accurately centric cylindrical wall, even if these centering portions themselves are simple and not highly accurate. Initially any irregularity of a centering portion, or of the cylindrical wall, only gives rise to a deflection of the relevant centering portion. The deflection results in a certain increase of the elastic force exerted on the wall by the centering portion. This force is taken up by a number of facing centering portions. Thus, each of these portions experiences a smaller force and hence a smaller deformation. In this way it is first of all achieved that an irregularity of a centering means or a local irregularity of the cylindrical wall can only give rise to an eccentricity smaller than the size of the irregularity itself. Secondly, it is achieved that irregularities occurring along the circumference of the centering means or along the circumference of the cylindrical wall can be compensated for, in a certain sense, by irregularities at the opposite side. This results in a kind of integration of positive and negative eccentricity effects. A method of centering optical discs utilizing the spring-nest effect has already been proposed by the Applicant in U.S. Pat. No. 4,218,065 (herewith incorporated by reference), namely for centering hubless discs on a drive spindle. The spring nest then forms part of the drive spindle.

In a first embodiment of the invention the hook-shaped ends of the clamping portions engage behind a side of a central part of a disc which is situated at the second side of the information carrier. This embodiment is suitable for information carriers intended to be read and/or inscribed on one side only and which need be provided with a hub on one side only. The information carrier may comprise one or a plurality of discs. In the latter case the hub assists in retaining the discs at the center hole.

Preferably, a second embodiment of the invention is utilized, which is characterized in that the centering means and the clamping means belong to a single integrated plastic part. Plastic parts of comparatively intricate shapes can be manufactured economically in large quantities by means of injection-moulding or compression moulding methods. A wide variety of different plastics with various properties are available for this purpose.

In a third embodiment the integrated part has a flange member which is elastically deflexible in an axial direction and which at its periphery is supported on the facing side of the information carrier. The clamping portions extend in substantially axial directions and are arranged at some distance from the periphery of the flange portion, so that the clamping portions are axially movable up to their final positions by exerting axial force on those portions of the integrated part which are situated nearer the center after mounting, the clamping portions remain permanently subjected to a tensile force as a result of the elasticity of the flange member. In this embodiment the hub is connected to the disc or discs without play which is often very desirable. In the case of a plurality of discs, the discs are clamped onto each other by the elastic tensile force exerted by the flange member. In principle, depending on the type of information carrier, the hub may therefore also serve for securing the discs, as well as any parts therebetween, to each other.

In a fourth embodiment the hub comprises a magnetisable clamping ring which is clamped between the disc and the integrated part as a separate element. In information carriers of this type the hub consequently comprises at least two parts. The integrated plastic part serves for centering the information carrier on a drive spindle and the magnetisable clamping ring serves for magnetic clamping. The clamping ring need only be a simple separate part because it is clamped onto the relevant disc by the integrated plastic part.

A fifth embodiment of the invention relates to an information carrier having a hub on one side only and is characterized in that the cross-sectionally hook-shaped end of the integrated part comprises a ring of hook-shaped cross-section. Although it does not comprise any independently deflectable separate centering elements, this embodiment utilizes a principle resembling the springnest principle there is an adequate local elastic deformation of the ring.

In a sixth embodiment of the invention the information carrier has a hub on each side. Both hubs have identical parts and the clamping portions of one hub extend between the clamping portions of the other hub. The centering means of each hub cooperate only with that portion of the inner wall of the center hole which is situated at the same side as the hub. The advantage of this embodiment is that although two hubs are employed only one type of parts is used. Steps are taken to ensure that each hub is centered at the side where it cooperates with a drive spindle. For information carriers which are readable on both sides this means that the information surface which is situated at the side of the drive spindle is always centered relative to the axis of rotation via the nearest portion of the inner wall of the center hole. If a plurality of discs are present each disc is thus centered individually, so that centering errors arising when the discs are mounted onto each other have no effect.

In a seventh embodiment of the invention the hub has a centering aperture for receiving a centering portion of the drive spindle of a drive means. A simple yet accurate centering may be achieved by cooperation of a cylindrical pin with a cylindrical bore of minimal diameter. This is because the absolute values of the tolerances on pins and bores are smaller for smaller diameters than for larger diameters. Even in the case of information carriers which, for whatever reason, are provided with a large center hole themselves, this embodiment enables an excellent centering with small tolerances. For example, for an identical sliding fit of a pin in a hole in conformity with the ISO system of fits, the tolerance is between 6 and 51 microns for a diameter of 15 mm and between 4 and 34 microns for a diameter of 4 mm (G7-h8 fit). With present technology it has become possible to manufacture pins and bores with only a few microns diametrical tolerance.

In an eight embodiment of the invention a plastic mounting ring is clamped between the integrated part and the disc. The hub has a magnetically attractable clamping ring made of a sheet material, which ring is situated on the surface of the integrated part and at its periphery is connected to the mounting ring by an elastic snap connection.

ADVANTAGES OF THE INVENTION.

The invention provides an information carrier comprising one or more hubs which can be mounted economically and rapidly, yet guarantee the required excellent centering. An optical information carrier in accordance with the invention having plastic discs with an outer diameter of approximately 13 cm can be centered with an accuracy which meets the specifications. This means that the orientation tracks which are preformed in the information surface of the discs during moulding have an eccentricy smaller than 35 $\mu$m relative to the axis of rotation during rotation of the information carrier.

If desired, the hub parts may be utilized for different types of information carriers, if required with different outer diameters and of different designs. It is then necessary only that the central parts of the information carriers have the same thickness dimension and the center holes have the same diameter. The hubs may be used at one side and, in a suitable embodiment, at two sides without a larger diversity of parts being required. On account of the axial mounting of the hubs they are very suitable for mounting by automatic mounting means. When a suitable embodiment is chosen mounting of a second hub on a second side of the information carrier does not require an intricate positioning of the second hub relative to the first hub. For example, the aforementioned sixth embodiment of the invention may be used. An automatic mounting apparatus can readily be constructed in such a way that the clamping portions of the hub on one side interengage between the clamping portions of a hub already mounted on the other side. For this purpose it is desirable that the ends of the clamping portions are bevelled in such a way that when they contact each other in the axial direction the second hub to be mounted is rotated slightly before it is axially pressed further.

Other advantages of the invention, not yet mentioned, can be obtained depending on the embodiment used and the purpose for which it is used. Comparing the information carrier in accordance with the invention with information carriers other than those already mentioned may reveal further advantages of the invention. More advantages will be mentioned in the description of the embodiments with reference to the drawings.

DESCRIPTION OF THE EMBODIMENTS SHOWN IN THE DRAWINGS

Figure 1:
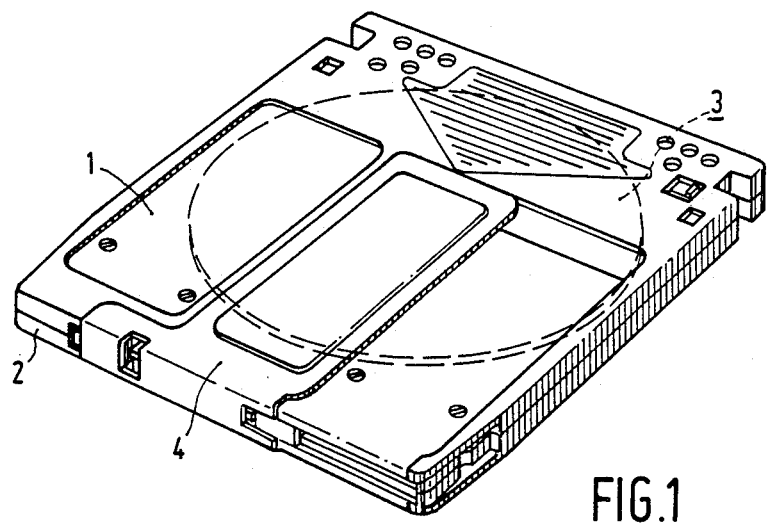
FIG. 1 is a perspective view of a cassette containing an information carrier in accordance with the invention.
Figure 2:
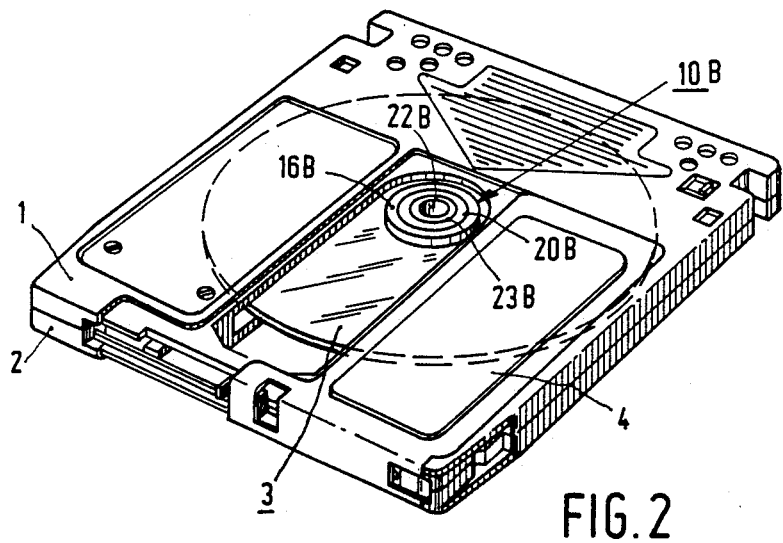
FIG. 2 is a view similar to that of FIG. 1, the shutter being shown in the open position.
Figure 3:
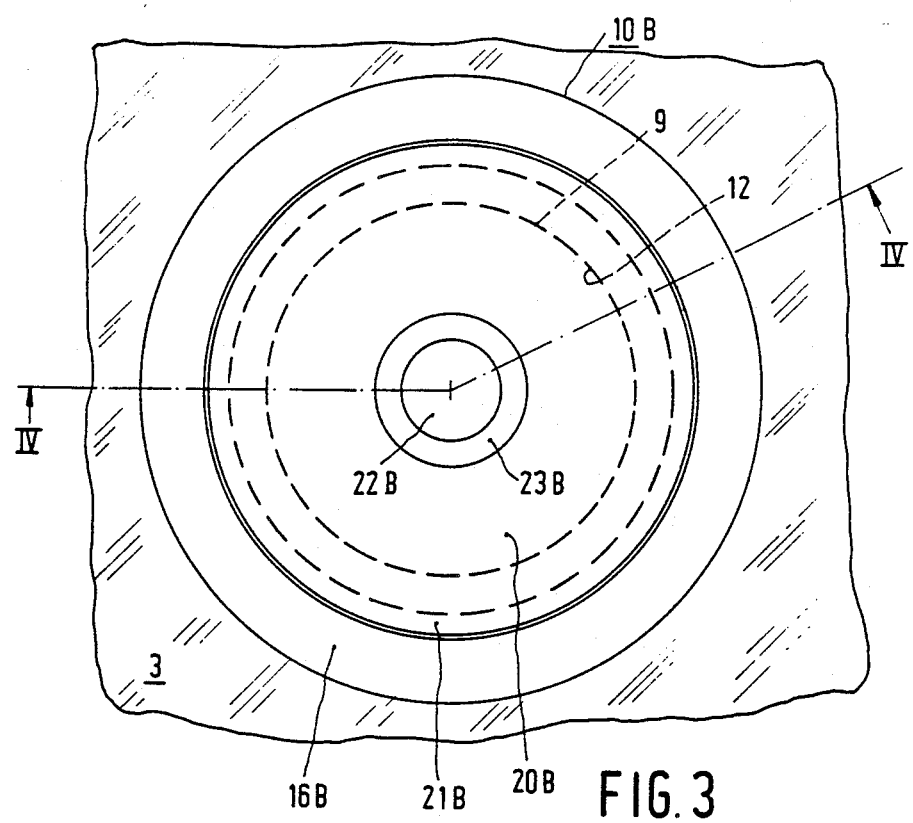
FIG. 3 is an enlarged-scale plane view of the central part of the information carrier as used in the cassette shown in FIGS. 1 and 2.

The cassette shown in FIGS. 1 and 2 is described in the Applicant's Netherlands patent application No. 8601944 (U.S. application No. 079,542, herewith incorporated by reference). The invention relates only to a modification of the information carrier contained in the cassette. The cassette includes a first section and a second section 2, which together constitute a box-shaped enclosure for the information carrier 3. This information carrier has a certain clearance within the cassette, so that it can be rotated inside the cassette with the aid of suitable means after a slidable shutter has been opened. The shutter 4 covers a slot in the wall of the cassette, enabling a drive spindle to cooperate with the information carrier and write and/or read means, such as magnetic heads or an optical head to be brought in the proximity of the rotating information carrier.

The information carrier 3 has a first side 3A to be directed towards a drive means and an opposite second side 3B. It includes two transparent plastic discs 5A and 5B having information surfaces 6A and 6B respectively. Which are covered with an optically modifiable layer. The two discs contact each other only near the central area 8 and near the circumference. In the central area a center hole 9 extends through both discs.

Two hubs 10A and 10B center and clamping the information carrier on the drive means 11. The hubs 10A and 10B have first centering means which cooperate with the inner wall 12 of the center hole 9 to center the hubs relative to the central axis of the discs as indicated by the broken line 14. Second centering means center the hubs and hence the information carrier relative to the drive means 11. At the side of the information carrier the hubs 10A and 10B have flange members 16A and 16B respectively, which bear on the central part 8.

The first centering means include radially resilient centering portions 17A and 17B respectively, which act against the inner wall 12 of the center hole. The hubs 10A and 10B have members 18A and 18B respectively, which extend through the center hole 9 and press the associated flange members 16A and 16B against the discs 5A and 5B respectively by cooperation with the central part 8 at the opposite side. The clamping means include radially resilient clamping members 18A and 18B whose ends 19A and 19B respectively are hook-shaped in cross-section. The hook end 19A engage behind the disc 5B, whilst the hook ends 19B engage behind the disc 5A.

Figure 4:
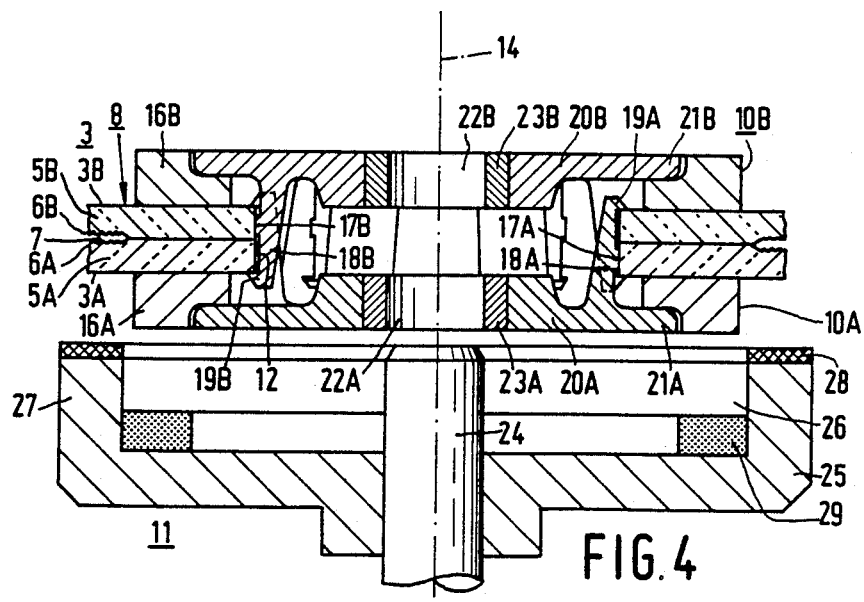
FIG. 4 is a sectional view taken on the lines IV—IV in FIG. 3, a drive spindle of a drive apparatus being also shown in sectional view.
Figure 5:
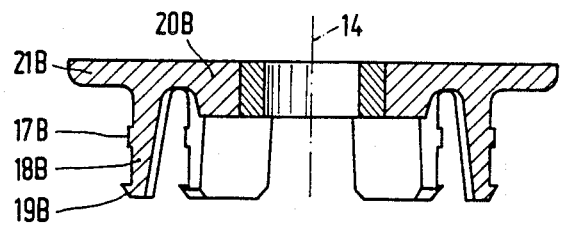
FIG. 5 is a sectional view of an integrated plastic part used in the information carrier.

The centering portions 17A and the clamping members 18A are part of a single integrated plastic part 20A. Similarly, the centering portions 17B and the clamping members 18B belong to a single integrated plastic part 20B. The integrated part 20A has a flange member 21A which is elastically deflectable in the axial direction and which bears against the first side 3A of the information carrier at the periphery. The clamping members 18A extend in substantially axial directions and are arranged at some distance from the periphery of the flange member 21A, so that they are axially movable into the end position, see FIG. 4, by exerting force along the axis 14 on those portions of the integrated part which are situated nearer the axis. In the mounted condition the clamping members 18A are constantly subject to a tensile force as a result of the elasticity of the flange member 21A. In the same way the integrated part 20B is provided with a deflectable flange member 21B and in the mounted condition the clamping members, 18B are constantly subject to a tensile force. Thus, the two discs 5A and 5B are drawn towards one another by the two hubs, which contributes to retaining the two discs to each other. The hubs 10A and 10B include magnetisable clamping rings in the form of respective flange members 16A and 16B. These are clamped between the integrated parts 20A, 20B and the discs 5A, 5B respectively as separate parts.

The two hubs 10A and 10B are identical. The integrated part 20A is identical to the integrated part 20B and the magnetisable clamping rings 16A and 16B are also identical. The integrated part is given such a shape that the clamping members 18A of the hub 10A extend between the clamping members 18B of the hub 10B. A very important characteristic feature of the invention is that the centering portions 17A of the hub 10A cooperate exclusively with that part of the inner wall 12 of the center hole 9 which is situated in the disc 5A. This means that the hub 10A is centered only relative to the disc 5A. Moreover, the hub 10B is centered only relative to the disc 5B. If the axes of rotation of the two discs do not coincide exactly, it is nevertheless ensured that during reading of the disc 5A this disc is aligned in an optimum manner relative to the drive means 11. This also applies to the other side of the information carrier.

The hubs 10A and 10B have respective centering apertures 22A and 22B formed in metal sleeves 23A and 23B respectively which are mounted in the integrated parts 20A and 20B respectively. The centering apertures receive the spindle 24 of the drive means spindle 11 which spindle is constituted by the end portion of a motor shaft on which a turntable 25 is mounted. The turntable 25 has a recessed central portion 26 with a circumferential wall 27 whose upper side carries a friction ring 28, for example made of rubber. A permanent-magnetic ring 29 is secured to the bottom of the recess 26.

During operation the spindle 24 is situated in a centering aperture 22A or 22B and the friction ring 28 bears on one of the discs 5A or 5B. The integrated part 20A and the clamping ring 16A are both situated in the recess 26, the magnet 29 being spaced from the clamping ring by an air gap to ensure that the full pressure is transmitted to the information carrier by the friction ring 28.

Figure 6:
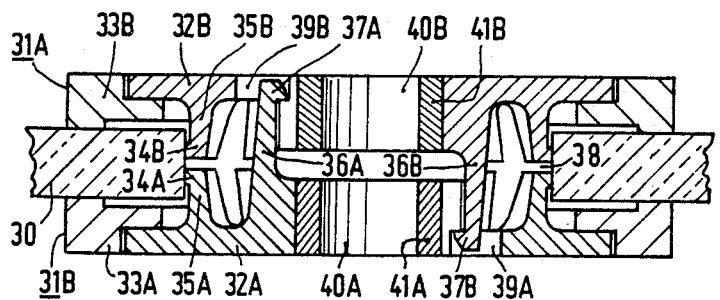
FIG. 6 is a sectional view through the center of an information carrier in another embodiment.

The embodiment shown in FIG. 6 differs only slightly from that shown in the preceding figures. In this embodiment the information carrier comprises only one disc 30, for example, a magnetic disc, and again carriers hubs 31A and 31B on both sides. The hubs 31A and 31B include respective integrated plastic parts 32A and 32B and flange members in the form of magnetic clamping rings 33A and 33B respectively. The centering portions 34A and 34B are situated on radially resilient portions 35A and 35B. The radially resilient clamping members 36A and 36B respectively which are situated nearer the center. The ends of these portions carry hook-shaped portions 37A and 37B which do not bear directly on the disc 30 at the other side of the center hole 38, but cooperate with the overlying integrated plastic part at the location of openings 39A and 39B. This is a major difference with the embodiment described in the foregoing, compare in particular FIG. 4. As is evident from FIG. 4, the integrated parts 20A and 20B can hardly be removed once they are mounted in the center hole of the information carrier. This is because the radially resilient clamping members 18A and 18B are practically inaccessible. In the embodiment shown in FIG. 6 the hook-shaped portions 37A and 37B are still accessible after mounting. The hubs in this embodiment can be removed, if necessary. The hubs have centering apertures 40A and 40B of smaller diameter than the center hole 38 of the disc 30 and they comprise metal sleeves 41A and 41B respectively. The information carrier shown in FIG. 6 is designed to cooperate with the drive means 11 shown in FIG. 4.

Figure 7:
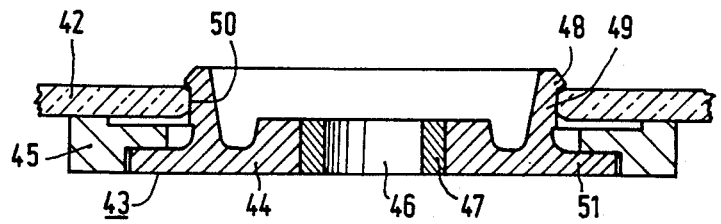
FIG. 7 is a similar sectional view of yet another embodiment.

FIG. 7 shows an embodiment which differs substantially. The disc 42 carries a hub 43 on one side only. Again the hub includes a single integrated part 44 and a magnetisable clamping ring 45 interposed between this part and the disc. Again a centering aperture 46 is formed in a metal sleeve 47. In this embodiment the cross-sectionally hook-shaped end of the integrated part 44 comprises a ring 48. The equally annular centering means 49 press against the inner wall 50 of the center hole of the disc by radial elastic deformation. The elastic deflection of the flange member 51 of the integrated part 44 ensures that the clamping ring 45 is tightened firmly.

Figure 8:
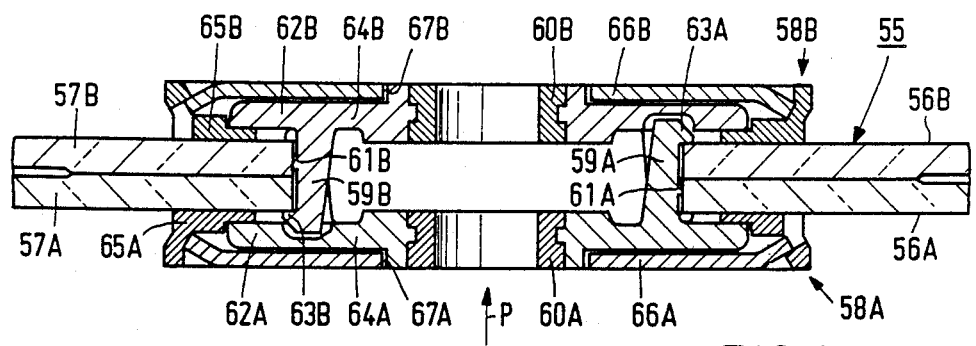
FIG. 8 is a sectional view of the central part of yet another embodiment of the invention.

The information carrier 55 in FIG. 8 has a first slide 56A to be directed towards a drive means and an opposite second side 56B. The information carrier is intended for use on two sides, so that the side 56B may also face the drive means. Therefore, the information carrier comprises two identical transparent discs 57A and 57B which each have a center hole. Each disc has a separate hub 58A and 58B respectively for centering and clamping the information carrier on a drive spindle. Each hub is provided with first centering means which cooperate with the inner wall of the center hole of the associated disc to center relative to the center of the associated disc. Second centering in the form of metal sleeves means 60A and 60B are provided for centering each hub and hence the associated disc relative to a drive spindle of a drive means, not shown. The first centering means include radially deflectable clamping members 59A and 59B which act against the inner wall of the center hole of the associated disc with the aid of centering portions 61A and 61B provided for this purpose. Each hub is provided with clamping means which extend through the center hole and which press the flange member 62A or 62B against the relevant disc by cooperation with facing side of the information carrier. The clamping means comprise the radially deflectable clamping members 59A and 59B which have cross-sectionally hook-shaped end portions 63A and 63B respectively which engage behind a part of the information carrier situated nearer the overlying side. The centering portions 61A and 61B and the clamping members 59A and 59B form parts of a respective integrated parts 64A and 64B.

Between the integrated parts 64A and 64B and the associated discs 57A and 57B, plastic mounting rings 65A and 65B are fitted. The hubs 58A and 58B are provided with magnetically attractable clamping rings 66A and 66B respectively, made of a sheet material. These rings are each mounted on the surface of the associated integrated part 64A and 64B. They have central bores 67A and 67B respectively of a diameter larger than that of sleeves 60A and 60B including the plastic material of the integrated part 64A and 64B situated around the sleeves. Thus, the clamping rings are not connected to the integrated parts near their 66A and 66B centers. At their peripheries the clamping rings are slightly bent and connected to the mounting rings 65A and 65B respectively by elastic snap connections.

Figure 9:
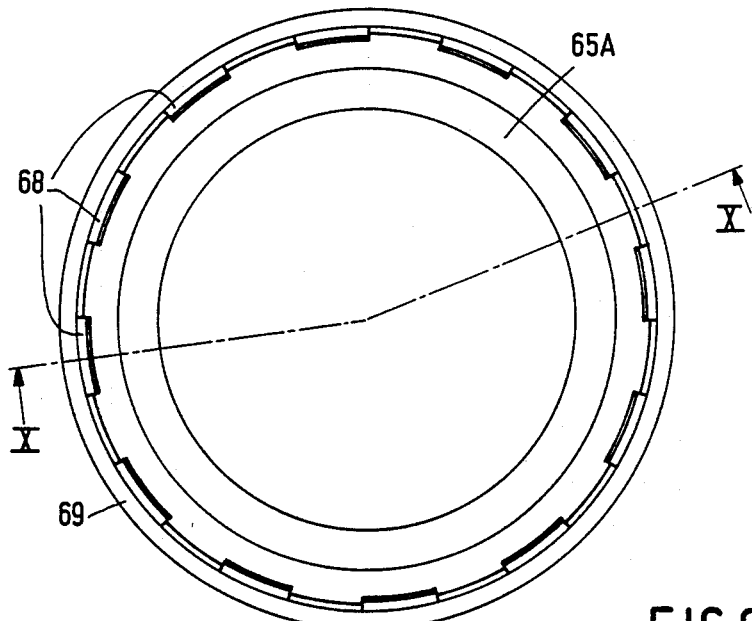
FIG. 9 is a view at a mounting ring in the direction indicated by the arrow P in FIG. 8.
Figure 10:
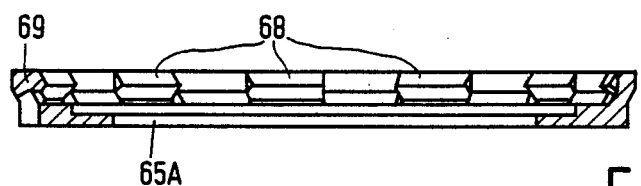
FIG. 10 is a cross-sectional view taken on the lines X—X in FIG. 9.

As is shown clearly in particular in FIGS. 9 and 10, the mounting ring 65A has a plurality of wedge shaped elements 68 near its periphery. The circumference of the clamping rings 66A and 66B is circular. These rings can be connected simply to the associated mounting rings by exerting axial pressure, causing the peripheral wall 69 of the mounting ring to be deformed slightly in a radially outward direction, so that the periphery of the clamping ring is pressed underneath the wedge-shaped elements 68. The rings 66A and 66B are fixed once the peripheral wall 69 has snapped back.

The embodiment shown in FIGS. 8 to 10 has some specific advantages. The three parts formed in the hub together constitute one assembly once the clamping 66A and 66B has been mounted. Thus, it is possible by simple snap mounting to pre-assemble the hubs before they are snap-mounted on the information carrier, which is possible by the radial deflection of the centering members 59A, B. Another advantage is that the clamping ring is of a very simple shape and can readily be stamped from a sheet material. A further advantage is that the clamping ring covers the axial end face of the hub over a larger area. This means that the magnetic clamping function of the hub is not critically dependent upon the position and/or the type of permanent magnet in the turntable.

It may also be advantageous to select the thickness of the sheet material in such a way that if the magnets of the turntable device are stronger than is strictly necessary, the magnetic clamping force does not become undesirably high, since the material of the clamping ring is then magnetically saturated. A suitable choice of the parameters thus automatically leads to the magnetic clamping force being limited. In practice, this means a comparatively small thickness of the clamping ring. This is readily possible by means of the embodiment shown. It facilitates the design of a permanent-magnetic turntable device. In the case of a suitable overdimensioning of the strength of the magnets fairly large tolerances in the magnetic properties and the dimensions of the air gap between the clamping ring and the magnets need not result in the maximum permissible magnetic clamping force being exceeded.

The drawings show some embodiments of the invention by way of non-limitative example. Although it is often advantageous to employ a single integrated part it is possible to construct the hub from a plurality of parts, while maintaining the advantages of the invention. Essential for the invention is that it provides a hub which can be mounted rapidly by snap-mounting and which nevertheless guarantees an excellent centering owing to the presence of the radially resilient centering members which are adapted to cooperate with the wall of the center hole of the disc. It is assumed that the center hole of each disc itself is centered with a high accuracy relative to the information structure of the information carrier or at least relative to the mass center, or the geometric center in the absence of an information structure.

It is not always necessary to surround the center hole in the hub by a metal bushing. Other materials may be used or the integrated part may be made of a material that is sufficiently stable.

What is claimed is:

1. An information carrier having a first side to be directed towards a drive means and an opposite second side, and comprising:

a disc provided with an information surface and having a central part of a dimensionally stable material formed with a center hole, and a hub for centering and clamping the information carrier on the drive means, which hub comprises first centering means adapted to cooperate with the inner wall of the center hole for centering the hub relative to the center of the disc, and second centering means for centering the hub and hence the information carrier relative to the drive means, which hub comprises a flange member at the first side of the information carrier, which flange member rests on the central part of the disc, characterized in that the first centering means comprise radially resilient centering portions which act against the inner wall the center hole, the hub comprises clamping means which pass through the center hole and by cooperation with the central part of the disc at the second side of the information carrier urge the flange member of the hub against the first side, and the clamping means comprise radially resilient clamping members each having a hooked end which is adapted to engage behind a part of the information carrier which is situated nearer the opposite side.

2. An information carrier as claimed in claim 1, comprising a hub on each side, characterized in that
both hubs comprise identical parts
the clamping members of one hub extend between the clamping members of the other hub, and
the centering means of each hub cooperate only with that portion of the inner wall of the center hole which is situated at the same side as said hub.

3. An information carrier as claimed in claim 1, characterized in that the hub has a centering aperture for receiving a centering spindle of the drive means.

4. An information carrier as claimed in claim 1, characterized in that the hooked ends of the clamping members engage behind a side of a central part of a disc which is situated at the opposite side of the information carrier.

5. An information carrier as claimed in claim 4, characterized in that
a plastic mounting ring is clamped between the integrated part and the disc, and
the hub comprises a magnetically attractable clamping ring made of a sheet material, which ring is situated on the surface of the integrated part and at its periphery is connected to the mounting ring by an elastic snap connection.

6. An information carrier as claimed in claim 1, characterized in that the centering portions and the clamping members belong to a single integrated plastic part.

7. An information carrier as claimed in claim 6, characterized in that the integrated part comprises a flange member which is elastically deflectable in an axial direction and which at its periphery is supported on the facing side of the information carrier, and in that the clamping members extend in substantially axial directions and are arranged at some distance from the periphery of the flange member so that the clamping members are axially movable up to their final positions by exerting axial force on these portions of the integrated part which are situated nearer the center and, after mounting, the clamping members are permanently subjected to a tensile force as a result of the elasticity of the flange member.

8. An information carrier as claimed in claim 6, characterized in that
the hub comprises a magnetisable clamping ring, and
the clamping ring is clamped between the disc and the integrated part as a separate element.

9. An information carrier as claimed in claim 6, having a hub on one side only, characterized in that the integrated part comprises a ring of hook-shaped cross-section, said hooked ends comprising portions of said ring.

10. An information carrier as claimed in claim 6, characterized in that
a plastic mounting ring is clamped between the integrated part and the disc, and
a hub comprises a magnetically attractable clamping ring made of a sheet material, which ring is situated on the surface of the integrated part and at its periphery is connected to the mounting ring by an elastic snap-connection.

11. An information carrier, for use with a rotatable drive means having a spindle, comprising
a pair of discs each having an information surface, and a central part of dimensionally stable material formed with a center hole with an inner wall therethrough, said discs being sandwiched together with their center holes at least substantially axially aligned,
a pair of hubs each having a flange member which rests on the central part of a respective disc and a plurality of radially resilient clamping members which extend through the holes of both discs and between the clamping members of the other hub, said clamping members each having a hooked end adapted to engage the central part of the disc opposite said respective disc to urge said flange against said respective disc, each said hub having first centering means comprising radially resilient centering portions which act only against the inner wall of the center hole of the respective disc to center the hub relative to the respective disc, each said hub further having second centering means for centering the hub relative to the drive means.

12. An information carrier as in claim 11 wherein the radially resilient centering portions comprise outward facing surfaces of the radially resilient clamping members.

13. An information carrier as in claim 11 wherein the hubs are identical.

14. An information carrier as in claim 11 wherein the centering portions and the clamping members of each hub belong to a single integrated plastic part.

15. An information carrier as in claim 14 wherein each said integrated plastic part comprises one of said flange members, said flange member resting on the central part of the respective disc at the periphery of the flange member, said flange members being elastically deflectable, said clamping members extending substantially axially and being spaced from said periphery so that said clamping members are axially movable to engage the central part of the opposite disc and remain in tension when so engaged.

16. An information carrier as in claim 14 wherein each hub further comprises a magnetizable clamping ring clamped between the respective integrated part and the respective disc.

17. An information carrier as in claim 14 wherein each said hub further comprises
a plastic mounting ring clamped between the respective integrated part and the respective disc,
a magnetizable clamping ring of sheet material bearing against the integrated part and retained at its periphery to the mounting ring by an elastic snap connection.

* * * * *